(12) United States Patent (10) Patent No.: US 8,854,376 B1
Bhat et al. (45) Date of Patent: Oct. 7, 2014

(54) GENERATING ANIMATION FROM ACTOR PERFORMANCE

(75) Inventors: Kiran S. Bhat, San Francisco, CA (US); Frederic P. Pighin, Sausalito, CA (US); Michael Koperwas, San Francisco, CA (US); Steve Sullivan, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 1152 days.

(21) Appl. No.: 12/512,454

(22) Filed: Jul. 30, 2009

(51) Int. Cl.
*G06T 13/00* (2011.01)
(52) U.S. Cl.
USPC .......................................... 345/473; 345/419
(58) Field of Classification Search
None
See application file for complete search history.

(56) References Cited

U.S. PATENT DOCUMENTS

| | | | | |
|---|---|---|---|---|
| 6,731,287 | B1* | 5/2004 | Erdem | 345/473 |
| 7,127,081 | B1* | 10/2006 | Erdem | 382/103 |
| 7,768,528 | B1* | 8/2010 | Edwards et al. | 345/619 |
| 7,830,384 | B1* | 11/2010 | Edwards et al. | 345/473 |
| 8,026,917 | B1* | 9/2011 | Rogers et al. | 345/473 |
| 8,207,963 | B2* | 6/2012 | Cotter et al. | 345/419 |
| 2002/0085738 | A1* | 7/2002 | Peters | 382/103 |
| 2004/0047415 | A1* | 3/2004 | Robert et al. | 375/240.01 |
| 2007/0104351 | A1* | 5/2007 | Yang et al. | 382/103 |
| 2007/0270214 | A1* | 11/2007 | Bentley | 463/30 |
| 2008/0180436 | A1* | 7/2008 | Kraver | 345/420 |
| 2008/0180448 | A1* | 7/2008 | Anguelov et al. | 345/475 |
| 2009/0185719 | A1* | 7/2009 | Erignac | 382/104 |
| 2010/0302258 | A1* | 12/2010 | Epps et al. | 345/474 |
| 2012/0077591 | A1* | 3/2012 | Geiss | 463/31 |

OTHER PUBLICATIONS

Grove, Ricky, 'Image Metrics: Cutting Edge Facial Animation Technology' [online], [retrieved on Jul. 29, 2009] [published Feb. 23, 2009]. Retrieved from the Internet: http://www.image-metrics.com/news/image-metrics/cutting-edge-facial-animation-technology.
'Image Metrics Facial Animation Makes Music Video Debut with Gnarls Barkley' [online], [retrieved on Jul. 29, 2009] [published on Jul. 24, 2008]. Retrieved from the Internet: http://www.image-metrics.com/press-release/image-metrics-facial-animation-makes-music-video-debut-gnarls-barkley.
'Image Metrics and the USC Institute for Creative Technologies Put a New Face on PhotoRealism with Animated CG Character' [online], [retrieved on Jul. 29, 2009] [published on Aug. 6, 2008]. Retrieved from the Internet: http://www.image-metrics.com/press-release/image-metrics-and-use-institute-creative-technologies-put-new-face-photo-realism-anima.
'Vicon MX Systems' [online], [retrieved on Jul. 29, 2009] [published on Jan. 29, 2008]. Retrieved from the Internet: http://web.archive.org/web/20080129145327/www.vicon.com/products/viconmx.html.
'Vicon Peak Motus Systems' [online],. [retrieved on Jul. 29, 2009] [published on Jul. 29, 2009]. Retrieved from the Internet: http://web.archive.org/web/20071224140633/www.vicon.com/products/peakmotus.html.
'Principal components analysis' [online]. Wikipedia, [retrieved on Jul. 29, 2009] [published on Nov. 11, 2007]. Retrieved from the Internet: http://web.archive.org/web/2007119063132/http://en.wikipedia.org/wiki/Principal_component_analysis.

* cited by examiner

*Primary Examiner* — David Zarka
*Assistant Examiner* — David H Chu
(74) *Attorney, Agent, or Firm* — Kilpatrick Townsend & Stockton LLP

(57) ABSTRACT

A motion library can be created by generating motion feature vectors for at least some of multiple frames of a video sequence using a 3D mesh, each motion feature vector corresponding to characteristics of the body deformation in one of the frames. The A user can select a subset of the frames. For each frame in the subset, the user can define settings for controls of an animation character, the settings selected by the user to correspond to the body deformation in the respective frame. Mappings are generated using the settings and the motion feature vectors, the mappings regulating the controls based on multiple motion feature vectors. The motion library can be used to generate an animation from an actor performance.

27 Claims, 4 Drawing Sheets

GENERATING ANIMATION FROM ACTOR PERFORMANCE

TECHNICAL FIELD

This document relates to animation.

BACKGROUND

Some existing computer animation systems rely on motion capture to perform animation. For example, makeup or other visual markers can be placed on an actor who then performs one or more motions in front of a camera. A two-dimensional motion pattern can be captured and translated into animated motion using a creature rig.

SUMMARY

The invention relates to generating animation from an actor performance.

In a first aspect, a computer-implemented method includes receiving, in a computer system, video content captured of an actor performing an act that involves a body deformation. The video content includes a sequence of frames. The method includes adapting, using the video content, a three-dimensional (3D) mesh in the computer system such that the 3D mesh corresponds to at least a part of the actor, the 3D mesh configured to deform according to the body deformation. The method includes generating motion feature vectors for at least some of the frames using the 3D mesh, each motion feature vector corresponding to characteristics of the body deformation in one of the frames. The method includes receiving, from a user, a selection of a subset of the frames. The method includes receiving input from the user that, for each frame in the subset, defines settings for controls of an animation character, the settings selected by the user to correspond to the body deformation in the respective frame. The method includes generating mappings using the settings and the motion feature vectors, the mappings regulating the controls based on multiple motion feature vectors.

The body deformation can include a deformation of at least part of the actor's face.

In a second aspect, a computer-implemented method includes receiving, in a computer system, video content captured of an actor performing an act that involves a body deformation. The video content includes a sequence of frames recorded without using physical markers applied to the actor that are designed for motion capture. The method includes adapting, using the video content, a three-dimensional (3D) mesh in the computer system such that the 3D mesh corresponds to at least a part of the actor, the 3D mesh configured to deform according to the body deformation. The method includes generating motion feature vectors for at least some of the frames using the 3D mesh, each motion feature vector corresponding to characteristics of the body deformation in one of the frames. The method includes specifying, for each of the motion feature vectors, settings for controls of an animation character, the settings specified using mappings that were generated in advance based on an earlier training session with the actor. The method includes generating an animation with the animation character using the settings, the animation including motion by the animation character corresponding to the body deformation.

Implementations can include any or all of the following features. The user can select the frame at any position among the multiple frames based on the body deformation being representative. Specifying the settings can include performing a mapping between a motion feature of the actor in performing the motion and the multiple controls. The motion feature can be represented using one of the motion feature vectors, and the motion feature vectors can assume values corresponding to respective different body deformations by the actor in performing the act. The motion feature vector can reflect a deformation of vertices in the frame with regard to a neutral frame. The motion feature vector can reflect a gradient of a deformation of vertices in the frame with regard to a neutral frame. The motion feature vector can reflect two-dimensional features of the video sequence. The video sequence can be stabilized on a texture space of a mesh corresponding to the actor, and the motion feature vector reflects two-dimensional features of the stabilized video sequence. The settings can be specified using at least a three-dimensional tracking performed on the actor in the video sequence. The settings can be specified using also a two-dimensional tracking performed on the actor in the video sequence. The three-dimensional tracking can be used to factor out rigid motion by the actor from the video sequence. The video sequence can be captured using one camera and the three-dimensional tracking can be performed using the 3D mesh tracking the motion. The method can further include creating a motion library in at least one earlier recording session with the actor, wherein the 3D mesh is adapted using also the motion library. Creating the motion library can include using a deformed template mesh and a tracked template mesh. The method can further include generating the deformed template mesh using scans. The method can further include generating a tracked three-dimensional cage for the tracked template mesh using earlier video sequences from the earlier recording session. The body deformation can include a deformation of at least part of the actor's face.

A method can be implemented using computer program product tangibly embodied in a computer-readable storage medium and that includes instructions that when executed by a processor perform the method.

In a third aspect, a system includes a camera capturing a video sequence of an actor performing a motion, the video sequence comprising multiple frames. The system includes a display device presenting at least one frame of the multiple frames to a user, the frame comprising a body configuration assumed by the actor in performing the act. The system includes an input device receiving at least one input that the user enters upon viewing the frame, the input defining a setting of at least one control so that an animation character corresponds to the body configuration. The system includes a mapping component determining settings for each of multiple controls associated with the animation character using the input, the settings determined so that an animation motion performed by the animation character corresponds to the act by the actor. The system includes an animation component generating, using the settings, an animation in which the animation character performs the animation motion.

Implementations can include any or all of the following features. The system can further include a motion library used in creating a three-dimensional mesh fitted to the video sequence of the actor and tracking the act, the motion library generated in at least one earlier recording session with the actor. The motion library can be created with a tracked template mesh using a deformed template mesh based on scans. The motion library can be created with a tracked template mesh using a tracked three-dimensional cage based on earlier video sequences from the earlier recording session. The body deformation can include a deformation of at least part of the actor's face.

Implementations can provide any or all of the following advantages. An actor's performance can be captured using a single video stream and retargeted. A framework that is scalable can be provided, for example for handling additional cameras, and that is not intrusive on a set. An accurate motion model for three-dimensional tracking of motions (e.g., facial expressions) can obtain a best measurement signal from input footage. Rigid motions of an actor's body (e.g., of the head) can be factored out from non-rigid skin deformation.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
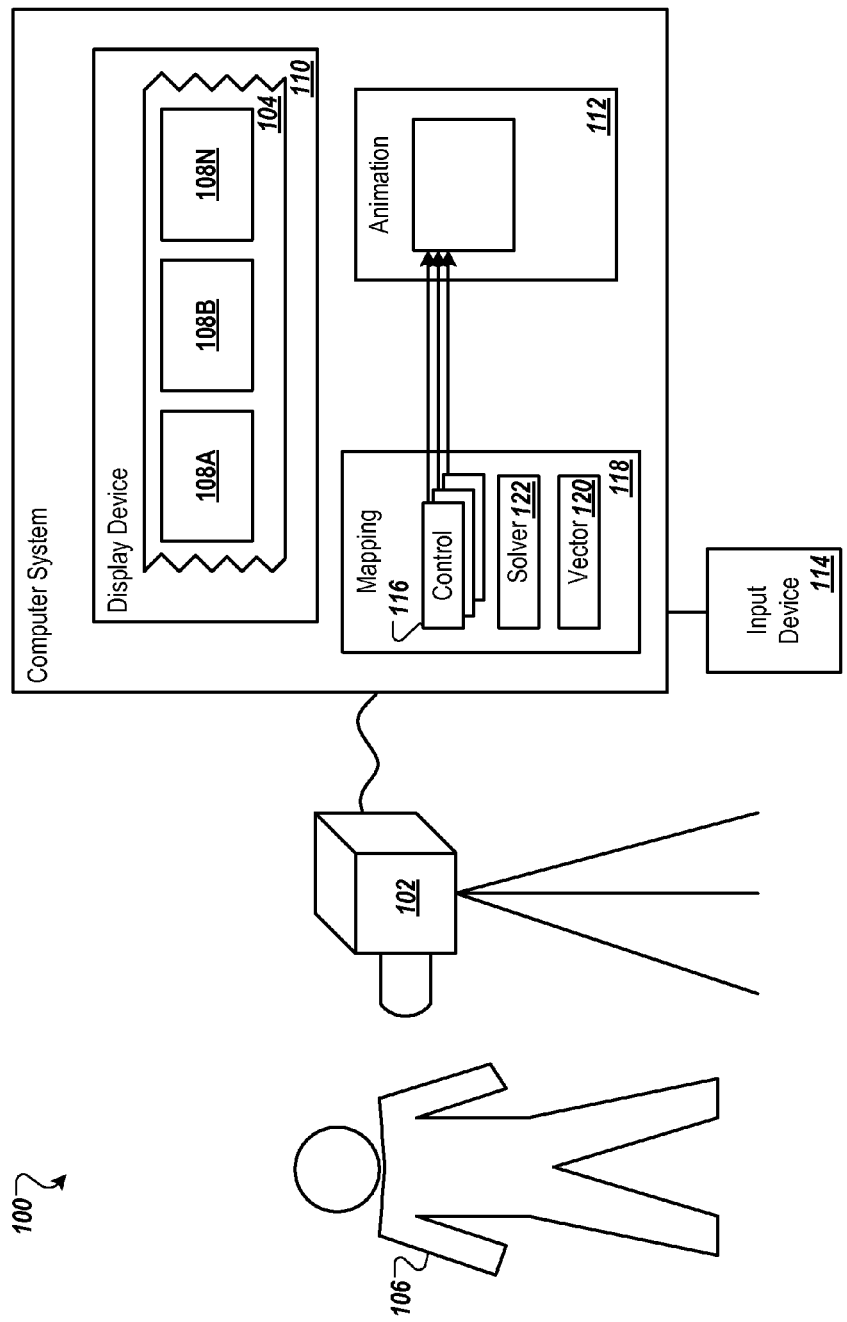
FIG. 1 shows an example system that can be used to create an animation from a video sequence.

FIG. 1 shows an example system 100 that can be used to create an animation from a video sequence. In some implementations, the system 100 can perform facial motion tracking and retargeting for use in creating the animation. Here, the system 100 includes a camera 102 that captures a video sequence 104 of an actor 106 performing a motion. The video sequence can include multiple frames 106A-N. Particularly, examples are described below that motion tracking can be performed using the video sequence although physical markers that are traditionally used for motion capture are not applied to the actor in the recording session.

Any kind of camera can be used to capture the video sequence, such as a digital camera, movie camera, rangefinder camera, video camera or view camera, to name a few examples. For example, the camera 102 can capture the video sequence 104 in a digital format so that any and all of the frames 106 can be stored in a suitable image format and handled individually.

The system 100 here includes a display device 110 for presenting any and all of the frames 106 to a user. Any kind of display device can be used, such as a computer monitor, television, movie projector or handheld device. In some implementations, the frame(s) can be presented for the user to view a body deformation by the actor 106 in performing the motion, such as the actor's facial expression. Based on viewing the expression, the user can configure an animation character such that it corresponds to the actor's expression, and this configuration can be used in creating an animation sequence in which the animation character performs animation motions corresponding to the actor's motion.

The system 100 here includes an animation component 112 that can be used to generate an animation sequence. In some implementations, the animation sequence can involve an animation character that is to undergo an animation sequence based on the motion of the actor 106 captured with the camera 102. For example, the animation component 112 can generate an animation of the animation character for presentation on the display device 110. The animation component 112 can be implemented as software, for example, and can include routines, algorithms, processes and/or modules that configure and manipulate the animation character undergoing the animation sequence, and generate the animation as a viewable item, such as an animation video sequence.

The system 100 here includes an input device 114 for receiving an input that the user enters upon viewing the frame(s) 108. In some implementations, the input device 114 can include a keyboard and/or a pointing device such as a mouse. The input device 114 can be associated with one or more controls 116 that define the operation of the animation created by the animation component 112. In some implementations, the input defines a setting of at least one of the controls 116 so that the animation character assumes a posture or stance that corresponds to the actor's body deformation in the frame(s) 108 viewed by the user. For example, one or more of the controls 116 can regulate an aspect of the animation character's face, such as the position of the character's eyelid, an eyebrow, and/or the orientation of the corners of the mouth.

The system 100 here includes a mapping component 118 that coordinates a mapping between features of the actor 106 in performing the motion with settings of the controls 116 for the animation character. In some implementations, settings for the controls 116 associated with the animation character can be determined using the input received from the user. For example, the settings can be determined so that an animation motion performed by the animation character corresponds to the motion by the actor 106. The mapping component 118 can be implemented as software, for example, and can include logic that associates motion features of the actor with particular values used for setting the controls 116.

A motion feature vector 120 can be defined based on one or more particular expressions by the actor 106. In some implementations, vertices can be defined for portions of the actor's body, such as for facial features, and such vertices can be used in defining the motion feature vector 120 for that particular expression. For example, a neutral pose by the actor 106 can be defined, say based on the frame 108A. The deformation of each vertex can then be measured with regard to the neutral pose for one or more other frames. As another example the gradient of the deformation of each vertex can be measured at one or more frames. As another example, the video sequence 104 can be stabilized on the texture space of a mesh defined for the actor 106. Two-dimensional features extracted from the stabilized or non-stabilized video sequence can be used by the mapping component 118.

In some implementations, the actor's face and/or another body part can be tracked in three dimensions by adapting a deformable mesh to fit the video sequence. Two-dimensional tracking of features and/or contours can provide detailed local motion information but may not accurately capture rigid head motions, such as a head rotation. With three-dimensional tracking, rigid motion of the actor's head can be factored out in the motion tracking. For example, this approach can be made robust to large head rotations by the actor or changes in camera perspective. As another example, the approach can allow detailed non-rigid deformations to be captured, such as those near the lips and eyes, which can provide an accurate measurement for retargeting. In some implementations, information from two-dimensional tracking can be combined with features from the tracked three-dimensional mesh.

Using the input device(s) 114, the user (e.g., an artist work on generating an animation) can set up the mapping between motion features and animation controls based on a subset of frames from the video. For example, the artist can select representative frames where the actor's body deformation (e.g., a facial gesture) can be translated into a corresponding configuration of the animation character, such as a happy, sad, excited or angry expression, or any other emotion. The artist can select a frame anywhere in the sequence as being representative, for example toward the beginning, in the middle, and/or toward the end of the sequence. One or more models can be fit to the mapping created by the artist.

In some implementations, the mapping component 118 can use a linear model. For example, an SVD-based regularization or a non-negative least squares calculation can be used to prevent overfitting in the linear method. The linear model can be fit to the user-specified mappings to describe the mapping so that further mappings can be deduced using the model.

In some implementations, the mapping component 118 can refine a linear model using a non-linear model. For example, one or more parametric models can be applied to correct the error in the linear model at the user-specified example frames. As another example, the deformation error at the user-specified frame can be blended to neighboring frames using any of multiple blending algorithms. For example, the mapping component 118 can map the deformation error to control parameters using a Gauss-Newton or LM solver.

Once a mapping has been learned from one or more examples, the system 100 (FIG. 1) can solve for control values (e.g., rig control values for an animation character) that correspond to feature vectors from other frames in the performance. Any type of solver can be used in various implementations. In some implementations, the mapping component 118 can use at least one solver 122 to determine the control value(s). For example, a cascade of solvers can be used for different parts of the actor's body, such as for regions of the face. As another example, the solver(s) 122 can use one or more filters for temporal filtering, such as a Gaussian or a bilateral filter.

Figure 2:
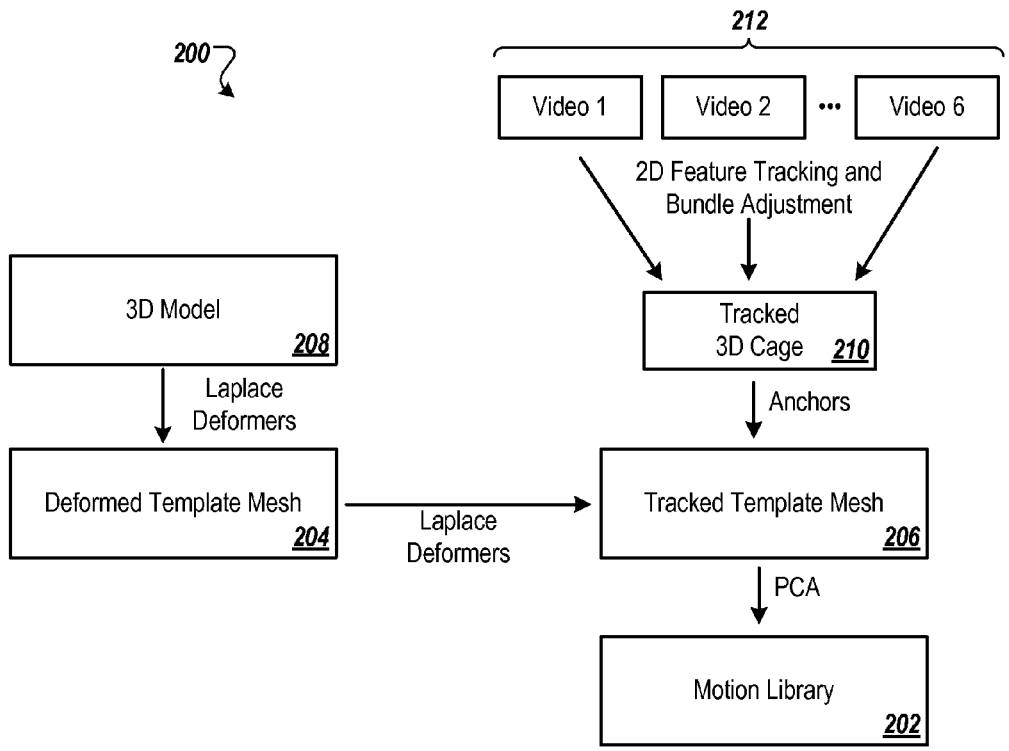
FIG. 2 shows an example system that can create a motion library in a training session.

FIG. 2 shows an example system 200 that can create a motion library 202 in a training session. In some implementations, the motion library 202 can be used to track the body deformation (e.g., a facial motion) of the actor 106. For example, using only the single camera 102 to capture the video sequence 104, the motion library 202 can be used to track the actor's motion(s) throughout multiple frames, although motion-capture markers are not applied to the actor in recording the video sequence.

Here, the motion library 202 is created using a deformed template mesh 204 and a tracked template mesh 206 by tracking the template mesh 206 to training footage. In some implementations, the deformed template mesh 204 can be created using one or more three-dimensional models 208 captured of the actor 106, such as scans obtained using a laser scanner, manually created models, or dense meshes from image-based three-dimensional reconstruction. For example, the scans 208 can be deformed using Laplace deformers to obtain the deformed template mesh 204.

In some implementations, the tracked template mesh 206 can be generated using the deformed template mesh 204 and a tracked three-dimensional cage 210. For example, a Laplace deformation can be performed on the deformed template mesh 204 in generating the tracked template mesh 206. The tracked three-dimensional cage 210 can be generated from multiple video sequences 212 involving the actor 106. For example, the video sequences 212 may have been be captured at an earlier recording session.

Figure 3:
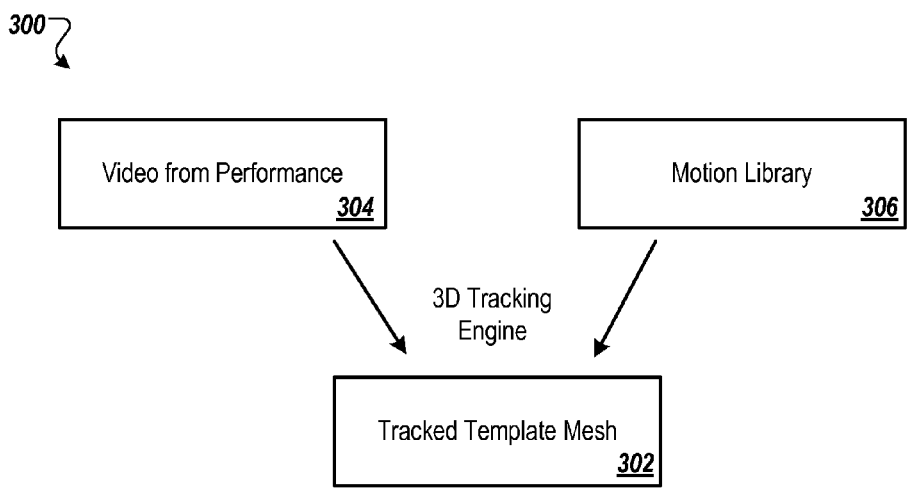
FIG. 3 shows an example system that can create a tracked template mesh.

FIG. 3 shows an example system 300 that can create a tracked template mesh 302, for example in tracking performance footage. The system 300 can receive as an input a video 304 from a performance of an actor. For example, the video sequence 104 (FIG. 1) can be input in the system 300 to generate an animation corresponding to the actor's motion. The video 304 can be input in any format, such as frame-by-frame in a file of a digitized image type.

The system 300 can refer to a motion library 306 in creating the tracked template mesh 302. In some implementations, the motion library 306 can include movements (e.g., facial expressions) by the actor registered in an earlier recording session. For example, the motion library 306 can be generated essentially as the motion library 202 described in the above example.

The tracked template mesh 302 can be used for one or more purposes. For example, the mapping component 118 (FIG. 1) can use the tracked template mesh 302 in deciding how to set the control(s) 116 for the animation component 112.

Figure 4:
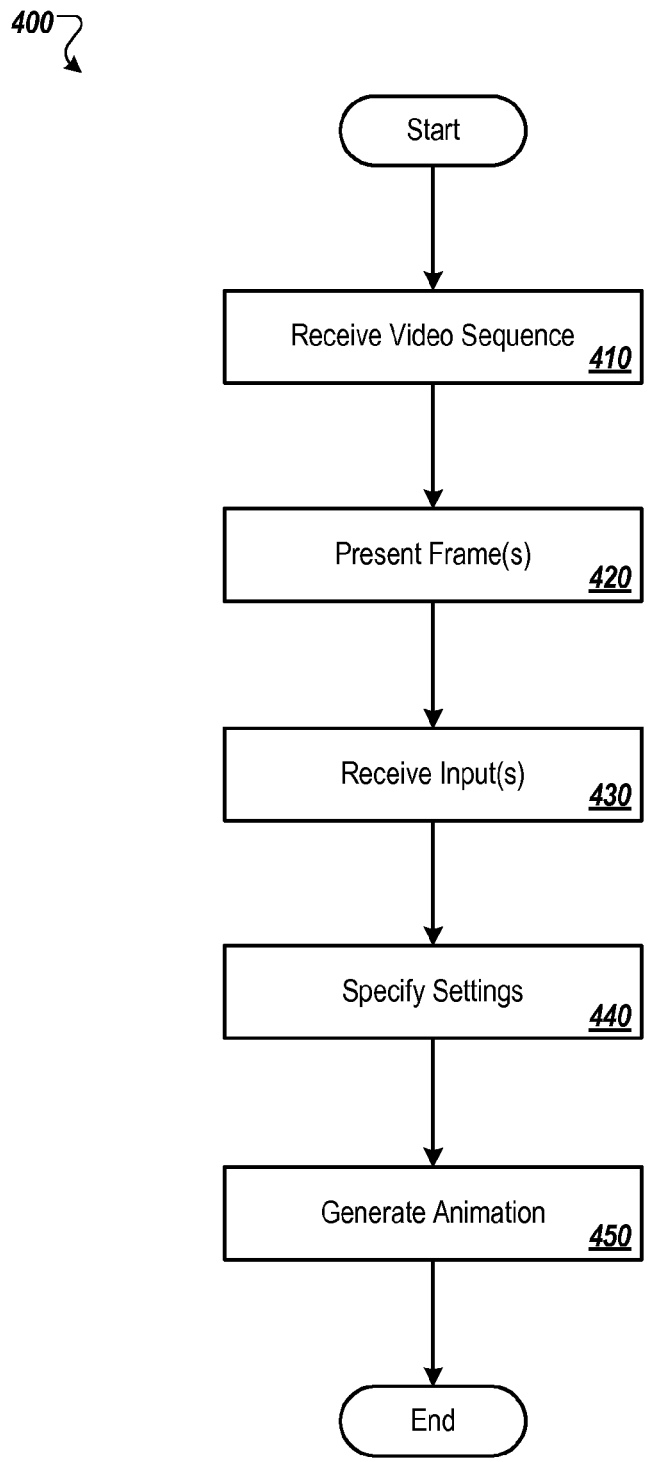
FIG. 4 shows a flow chart of an example method of creating an animation.

FIG. 4 shows a flow chart of an example method 400 for creating an animation. The method 400 can be performed by a processor executing instructions stored in a tangible computer-readable medium, such as in the system 100 (FIG. 1). In some implementations, more or fewer steps can be performed. As another example, one or more steps can be performed in another order.

In step 410, a video sequence of an actor performing a motion is received. The video sequence includes multiple frames recorded without using physical markers applied to the actor that are designed for motion capture. For example, the video sequence 104 of the actor 106 can be received in the system 100.

Step 420 involves presenting at least one frame of the multiple frames to a user. The frame includes a body deformation by the actor in performing the motion.

Step 430 involves receiving at least one input that the user enters upon viewing the frame, the input defining a setting of at least one control so that an animation character corresponds to the body deformation.

Step 440 involves specifying settings for each of multiple controls associated with the animation character using the input, the settings specified so that an animation motion performed by the animation character corresponds to the motion by the actor.

Step 450 involves generating, using the settings, an animation in which the animation character performs the animation motion.

Figure 5:
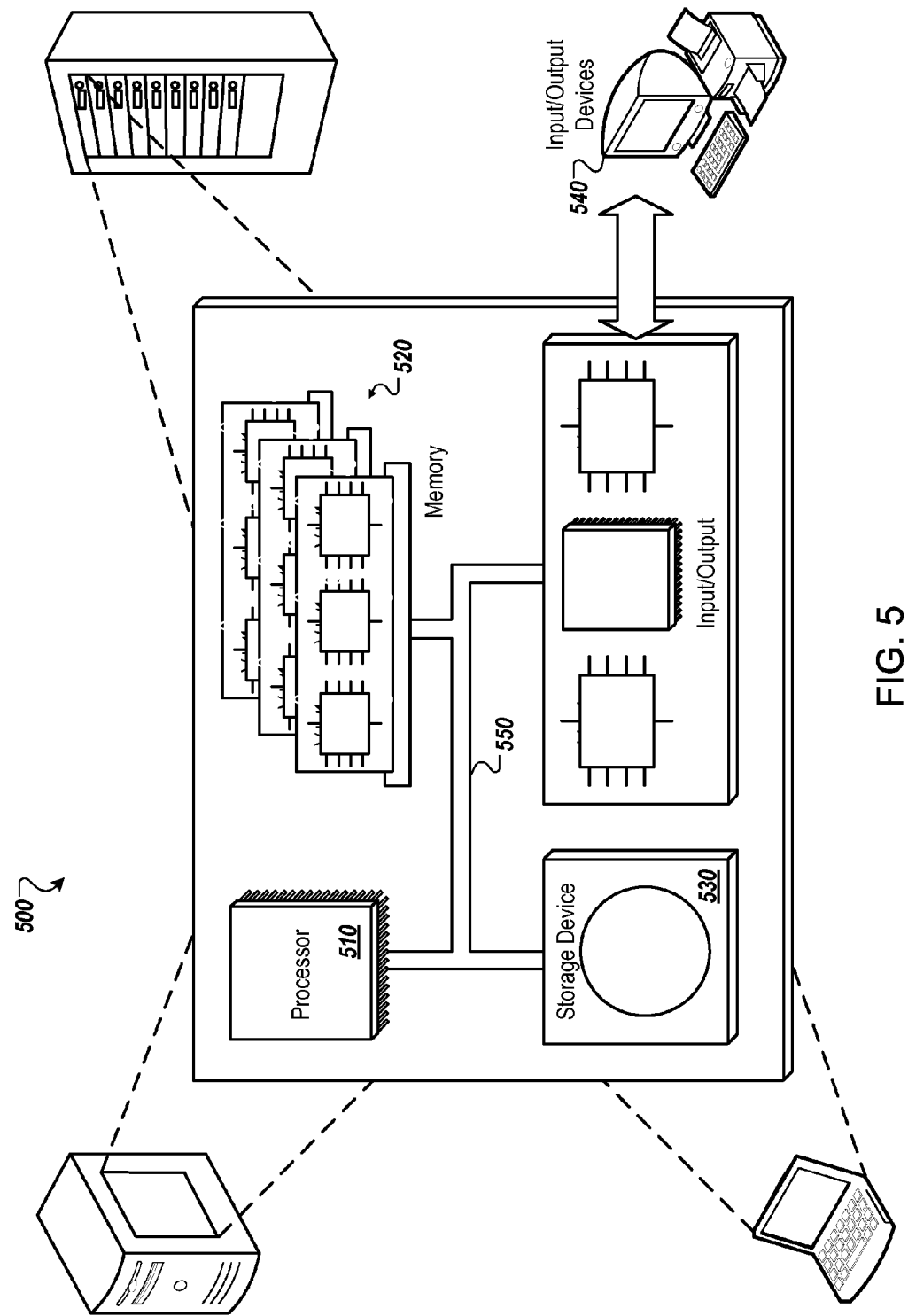
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
   receiving, in a computer system, video content captured of an actor performing an act that involves a body deformation, the video content including a sequence of frames and recorded without using physical markers applied to the actor that are designed for motion capture;
   adapting, using the video content, a three-dimensional (3D) mesh in the computer system such that the 3D mesh corresponds to at least a part of the actor, the 3D mesh configured to deform according to the body deformation;
   generating motion feature vectors for at least some of the frames using the 3D mesh, each motion feature vector corresponding to characteristics of the body deformation in one of the frames;
   specifying, for each of the motion feature vectors, settings for controls of an animation character, the settings specified using mappings that were generated in advance based on an earlier training session with the actor, wherein the settings are specified using information from two-dimensional tracking of facial contours to provide detailed local motion information and information from three-dimensional tracking of rigid motion of one or more body parts of the actor and
   generating an animation with the animation character using the settings, the animation including motion by the animation character corresponding to the body deformation.

2. The computer-implemented method of claim 1, wherein the user selects the frame at any position among the multiple frames based on the body deformation being representative.

3. The computer-implemented method of claim 1, wherein specifying the settings comprises performing a mapping between a motion feature of the actor in performing the motion and the multiple controls.

4. The computer-implemented method of claim 3, wherein the motion feature is represented using one of the motion feature vectors, and wherein the motion feature vectors assume values corresponding to respective different body deformations by the actor in performing the act.

5. The computer-implemented method of claim 4, wherein the motion feature vector reflects a deformation of vertices in the frame with regard to a neutral frame.

6. The computer-implemented method of claim 4, wherein the motion feature vector reflects a gradient of a deformation of vertices in the frame with regard to a neutral frame.

7. The computer-implemented method of claim 4, wherein the motion feature vector reflects two-dimensional features of the video sequence.

8. The computer-implemented method of claim 7, wherein the video sequence is stabilized on a texture space of a mesh corresponding to the actor, and wherein the motion feature vector reflects two-dimensional features of the stabilized video sequence.

9. The computer-implemented method of claim 1, wherein the rigid motion of one or more body parts of the actor includes the actor's rigid head motions.

10. The computer-implemented method of claim 1, wherein the detailed local motion information represents non-rigid deformations near the actor's lips or eyes.

11. The computer-implemented method of claim 1, wherein the three dimensional tracking is used to factor out rigid motion by the actor from the video sequence.

12. The computer-implemented method of claim 1, wherein the video sequence is captured using one camera and the three-dimensional tracking is performed using the 3D mesh tracking the motion.

13. The computer-implemented method of claim 12, further comprising creating a motion library in at least one earlier recording session with the actor, wherein the 3D mesh is adapted using also the motion library.

14. The computer-implemented method of claim 13, wherein creating the motion library comprises using a deformed template mesh and a tracked template mesh.

15. The computer-implemented method of claim 14, further comprising generating the deformed template mesh using scans.

16. The computer-implemented method of claim 14, further comprising generating a tracked three-dimensional cage for the tracked template mesh using earlier video sequences from the earlier recording session.

17. The computer-implemented method of claim 1, wherein the body deformation includes a deformation of at least part of the actor's face.

18. A system comprising:
a display;
a computer-readable storage device having a computer program stored thereon;
one or more processing devices operable to execute the computer program, interact with the display and perform operations comprising:
receiving video content captured of an actor performing an act that involves a body deformation, the video content including a sequence of frames and recorded without using physical markers applied to the actor that are designed for motion capture;
adapting, using the video content, a three-dimensional (3D) mesh in the one or more processing devices such that the 3D mesh corresponds to at least a part of the actor, the 3D mesh configured to deform according to the body deformation;
generating motion feature vectors for at least some of the frames using the 3D mesh, each motion feature vector corresponding to characteristics of the body deformation in one of the frames;
specifying, for each of the motion feature vectors, settings for controls of an animation character, the settings specified using mappings that were generated in advance based on an earlier training session with the actor, wherein the settings are specified using information from two-dimensional tracking of facial contours to provide detailed local motion information and information from three-dimensional tracking of rigid motion of one or more body parts of the actor; and
generating an animation with the animation character using the settings, the animation including motion by the animation character corresponding to the body deformation.

19. The system of claim 18, further comprising a motion library used in creating a three-dimensional mesh fitted to the video sequence of the actor and tracking the act, the motion library generated in at least one earlier recording session with the actor.

20. The system of claim 19, wherein the motion library is created with a tracked template mesh using a deformed template mesh based on scans.

21. The system of claim 19, wherein the motion library is created with a tracked template mesh using a tracked three-dimensional cage based on earlier video sequences from the earlier recording session.

22. The system of claim 18, wherein the body deformation includes a deformation of at least part of the actor's face.

23. A computer program product embodied in a non-transitory computer-readable medium and comprising instructions that when executed by a processor perform operations comprising:
receiving video content captured of an actor performing an act that involves a body deformation, the video content including a sequence of frames and recorded without using physical markers applied to the actor that are designed for motion capture;
adapting, using the video content, a three-dimensional (3D) mesh in the one or more processing devices such that the 3D mesh corresponds to at least a part of the actor, the 3D mesh configured to deform according to the body deformation;
generating motion feature vectors for at least some of the frames using the 3D mesh, each motion feature vector corresponding to characteristics of the body deformation in one of the frames;
specifying, for each of the motion feature vectors, settings for controls of an animation character, the settings specified using mappings that were generated in advance based on an earlier training session with the actor, wherein the settings are specified using information from two-dimensional tracking of facial contours to provide detailed local motion information and information from three-dimensional tracking of rigid motion of one or more body parts of the actor; and
generating an animation with the animation character using the settings, the animation including motion by the animation character corresponding to the body deformation.

24. The computer program product of claim 23 further comprising a motion library used in creating a three-dimensional mesh fitted to the video sequence of the actor and tracking the act, the motion library generated in at least one earlier recording session with the actor.

25. The computer program product of claim 24 wherein the motion library is created with a tracked template mesh using a deformed template mesh based on scans.

26. The computer program product of claim 24 wherein the motion library is created with a tracked template mesh using a tracked three-dimensional cage based on earlier video sequences from the earlier recording session.

27. The computer program product of claim 23 wherein the body deformation includes a deformation of at least part of the actor's face.

* * * * *